Figure 1:
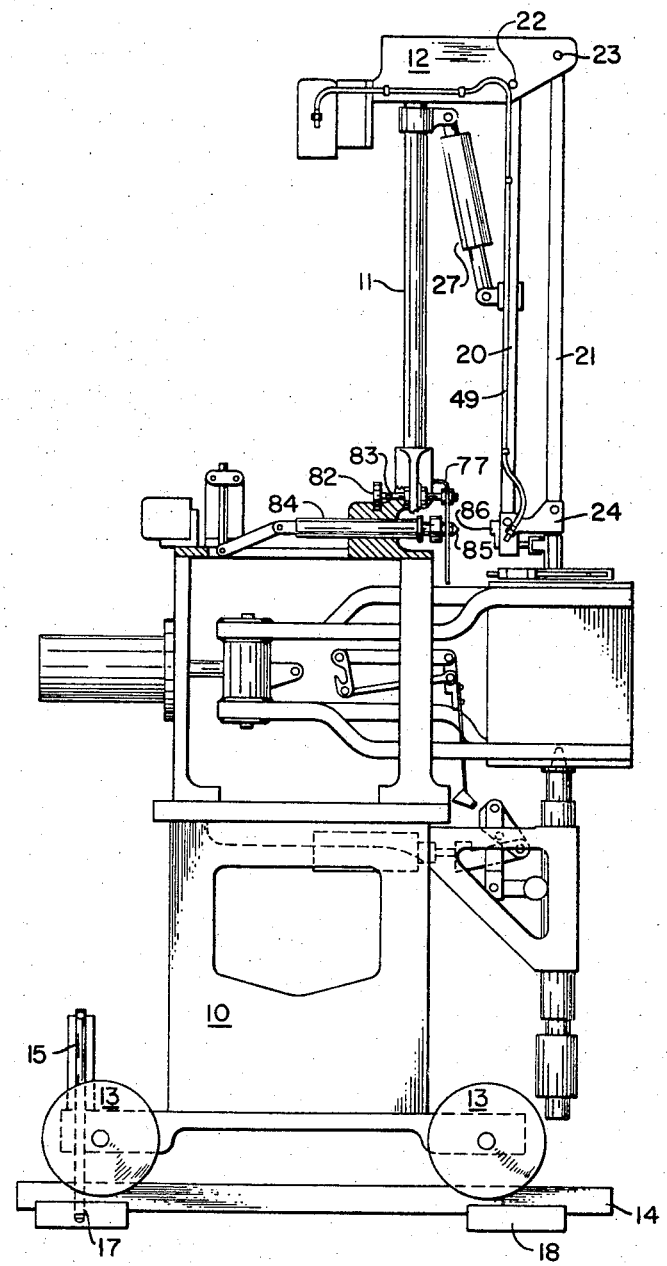

INVENTORS
CLEMENT V. FOGELBERG
WILLIAM D. HOUGH
ATTORNEYS

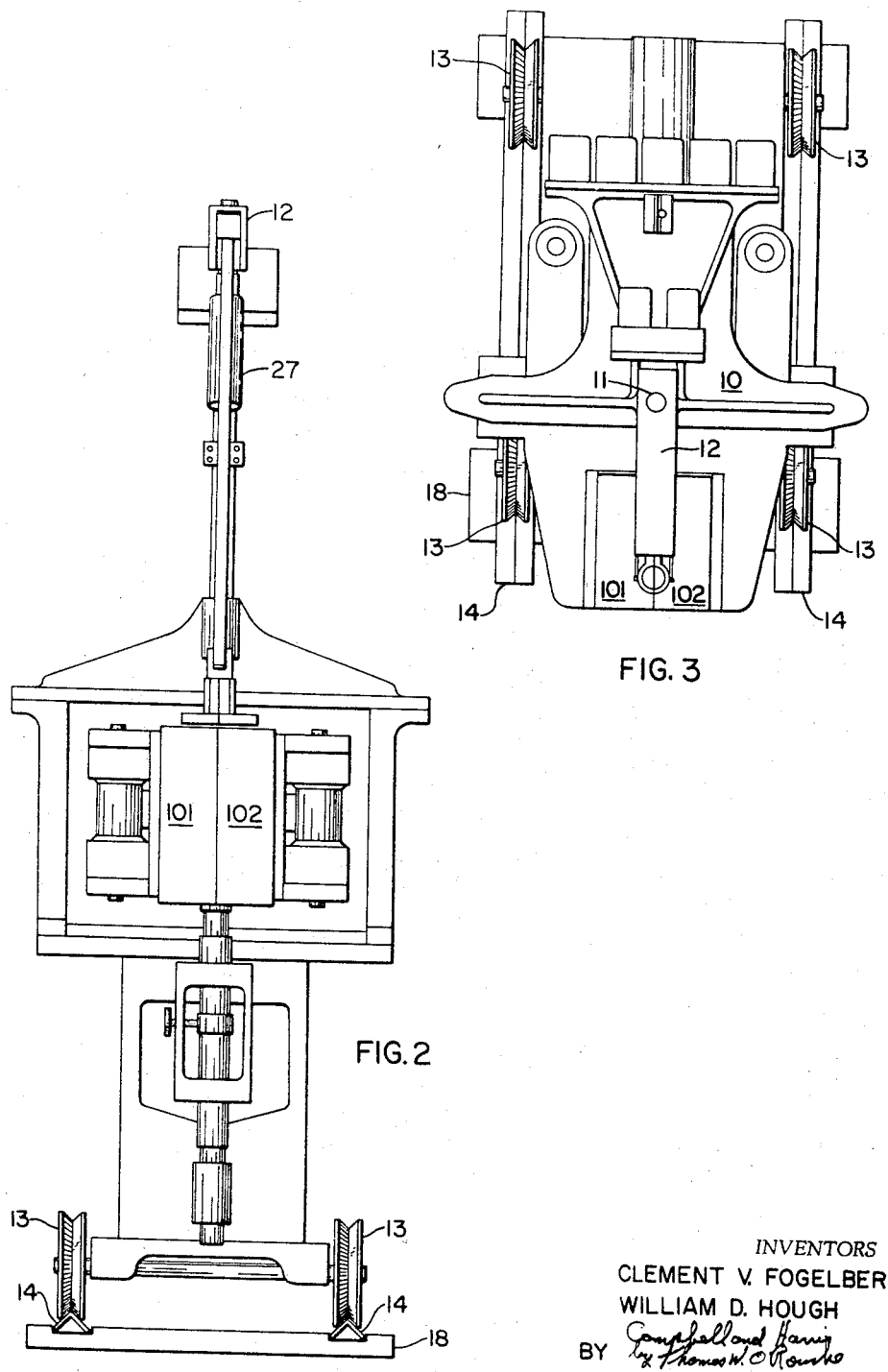

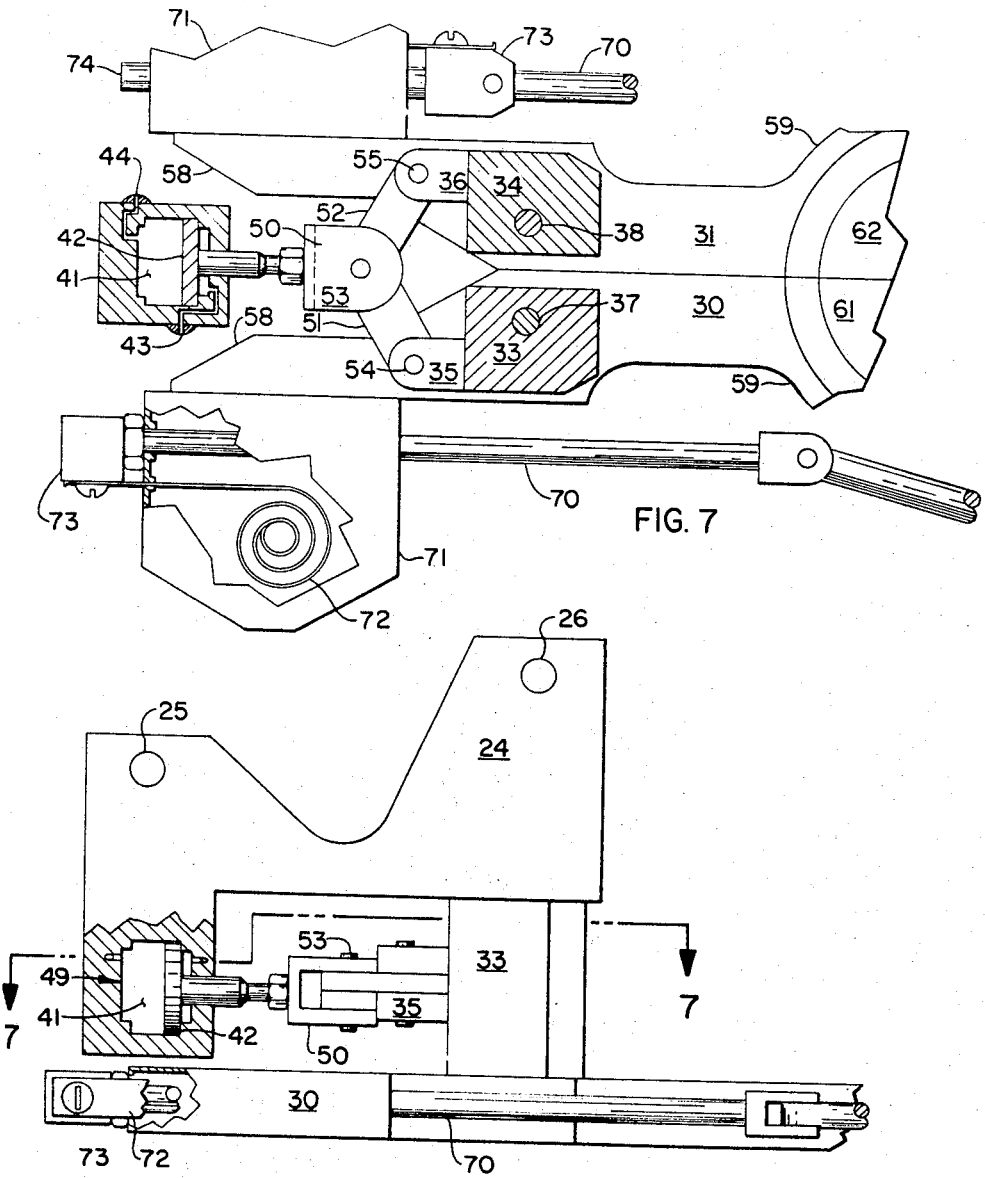

INVENTORS
CLEMENT V. FOGELBERG
WILLIAM D. HOUGH
ATTORNEYS

Oct. 22, 1968     C. V. FOGELBERG ET AL     3,407,250
METHOD FOR MANUFACTURING HOLLOW PLASTIC ARTICLES
Original Filed March 25, 1963     7 Sheets-Sheet 6

INVENTORS
CLEMENT V. FOGELBERG
WILLIAM D. HOUGH
BY
ATTORNEYS

Oct. 22, 1968  C. V. FOGELBERG ET AL  3,407,250
METHOD FOR MANUFACTURING HOLLOW PLASTIC ARTICLES
Original Filed March 25, 1963  7 Sheets-Sheet 7

INVENTORS
CLEMENT V. FOGELBERG
WILLIAM D. HOUGH
BY
ATTORNEYS

United States Patent Office 3,407,250
Patented Oct. 22, 1968

3,407,250
METHOD FOR MANUFACTURING HOLLOW PLASTIC ARTICLES
Clement V. Fogelberg, Boulder, and William D. Hough, Denver, Colo., assignors to Ball Brothers Company Incorporated, Muncie, Ind., a corporation of Indiana
Original application Mar. 25, 1963, Ser. No. 268,515, now Patent No. 3,257,687, dated June 28, 1966. Divided and this application Feb. 1, 1966, Ser. No. 541,043
3 Claims. (Cl. 264—99)

This application is a divisional application of Clement V. Fogelberg et al. application Ser. No. 268,515, filed Mar. 25, 1963 now Patent No. 3,257,687.

This invention relates to a new and improved method and apparatus for molding plastic articles and particularly to a novel method and apparatus for molding hollow plastic articles such as containers or bottles by the blow molding principle.

The growth of the plastic article industry in recent years has made it necessary for manufacturers not only to produce articles at high production rates, but also to produce a great variety of articles which may vary widely in size, shape, or weight. Although the extrusion rates of commercial extrusion machines may be varied within wide limits, and the nozzles of the machines may be altered to produce parisons or tubes of widely varying diameters and peripheral shapes, such flexibility has not been attainable with previous molding equipment. As a result, it was impossible heretofore to produce both large articles and small articles continuously on the same machine and still retain a high rate of production.

It is well known that a small article normally requires a parison of less material than does a large article and that it takes a proportionately longer time to extrude a large article than it does a smaller article with less material. However, the duration of the molding cycle for the large article is usually not proportionately longer than the molding cycle for the smaller article but rather is of relatively shorter duration. Therefore, manufacturers were faced with the problem of designing molding apparatus capable of utilizing many mold stations with one extruder, which apparatus also permits adjustment of the molding capacity of the stations to efficiently utilize the lower extrusion or parison-producing rate of a particular extrusion machine when large articles are being produced.

In view of the shortcomings and difficulties encountered with previous molding methods and apparatus, it was totally unexpected and surprising to discover a new and improved method and apparatus for molding hollow plastic articles which not only overcome the above problems but also effectively utilize the most rapid extrusion rates practicable. An additional advantage of the invention is the great flexibility of operation which permits the production of articles varying widely in size, shape and weight. Moreover, the new and improved method and apparatus of the invention permit the transfer of a length of extruded tubing, hereinafter referred to as a parison, from an extrusion nozzle to a mold station so as to minimize sagging or stretching of the parison due to its suspension in a normally hot and formable condition. A further advantage of the apparatus of the invention is that the parison can be accurately positioned within a blow mold prior to the closing thereof. Also, the present invention provides a simple and convenient means for removing molded articles from a mold station.

Figure 6:
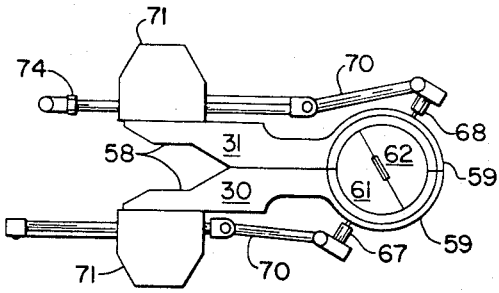
Figure 5:
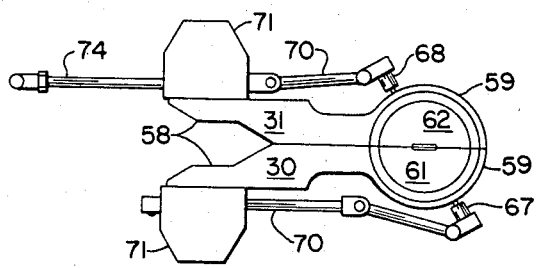
Figure 4:
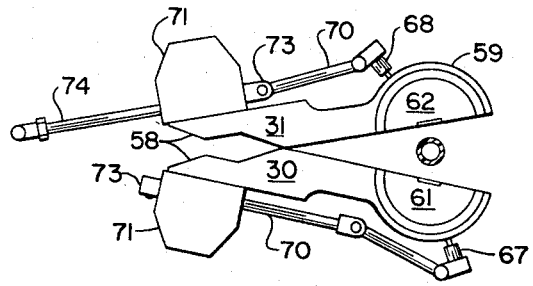
Figure 9:
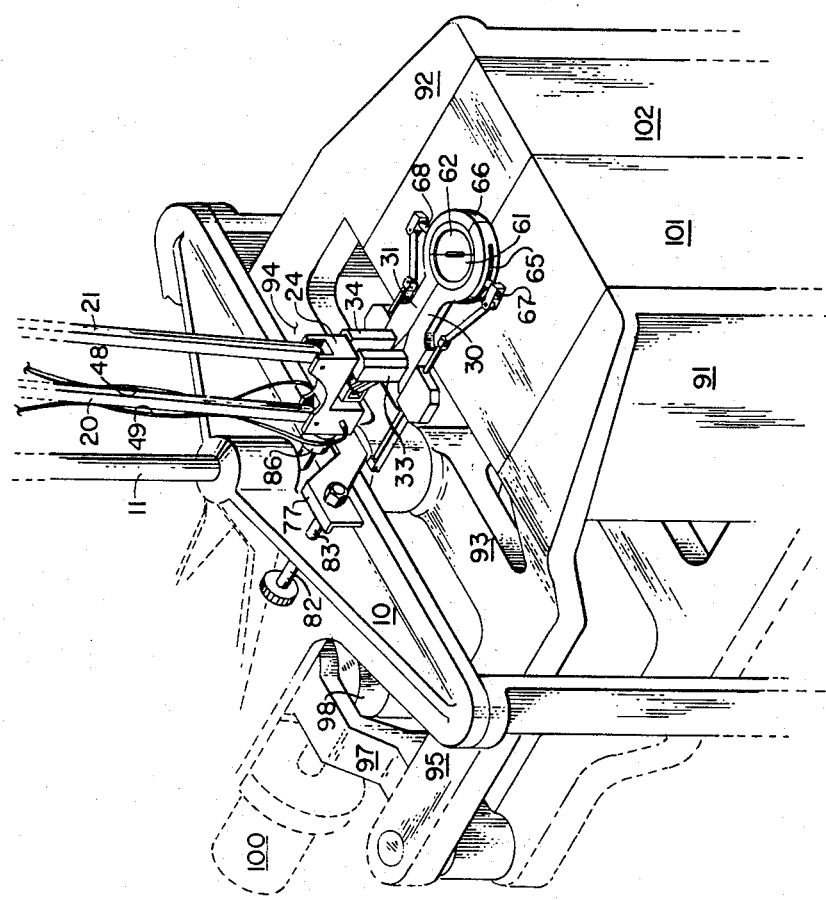
Figure 10:
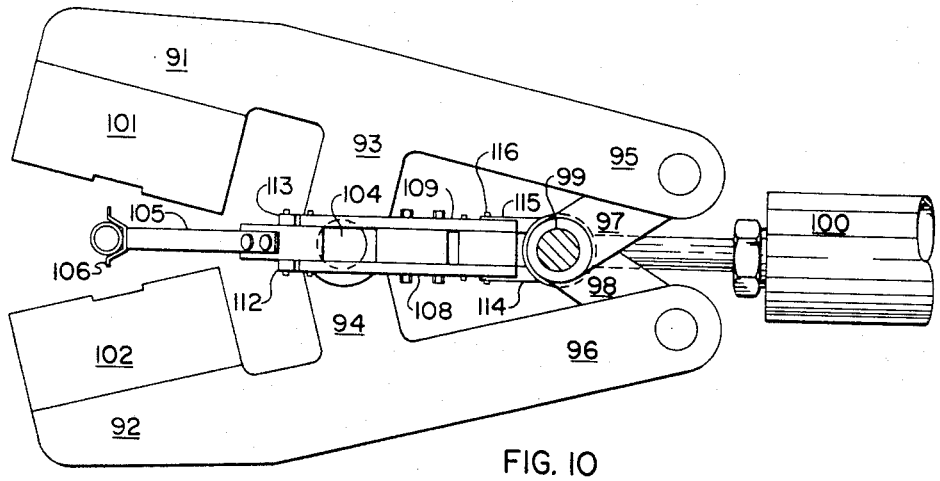
Figure 11:
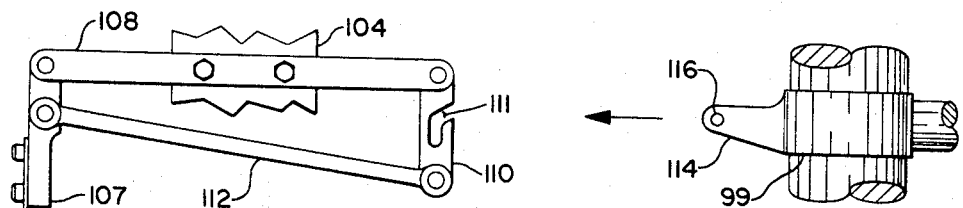
Figure 12:
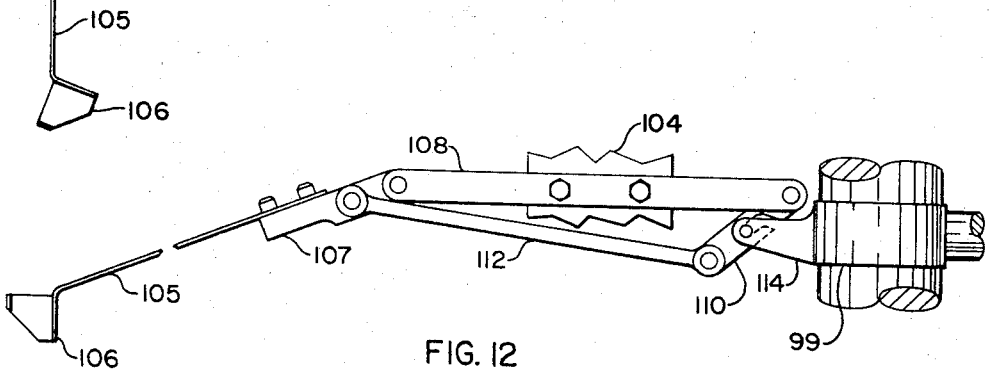
Figure 13:
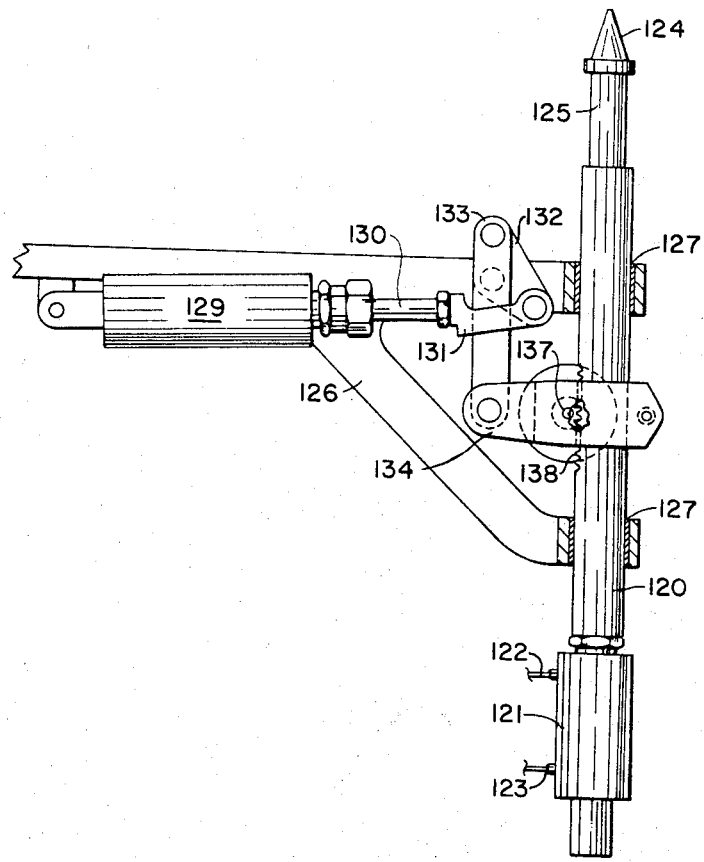

Other advantages and features of the invention will be apparent from the following description and drawings, in which:

FIGURE 1 is a side view of a mold station of the present invention;

FIGURE 2 is a front view of a mold station;
FIGURE 3 is a plan view of a mold station;
FIGURES 4, 5, and 6 are enlarged plan views of a parison orienter portion of a mold station;
FIGURE 7 is a sectional view taken along line 7—7 of FIGURE 8;
FIGURE 8 is a side view of a portion of the transfer assembly;
FIGURE 9 is a perspective view of a portion of a mold station;
FIGURE 10 is a plan view of a parison positioner portion of a mold station and its relationship to the mold;
FIGURES 11 and 12 are side views of a parison positioner showing its extreme positions during operation; and
FIGURE 13 is a side view of a blow stick assembly of a mold station.

As shown in the drawings, the frame 10 has wheels 13 secured to the lower portion thereof, which wheels are in contact with rails 14 radially carried by members 17 and 18. Each mold station may be firmly fixed upon the rails 14 by engagement of a rod 15 carried by the mold station, which rod passes through an appropriate opening in one of the rails 14.

A vertical support 11 projects upwardly from the mold station and has secured thereto a horizontal member 12 which serves as a support for a transfer mechanism to be described. Member 12 has pivot points 22 and 23 to which are attached a pair of movable parallel arms 20 and 21. These arms are pivotably joined at their opposite ends by a member 24 which holds arms 20 and 21 parallel throughout their arcuate movement so that member 24 is always horizontally disposed and parallel to the upper member 12. Thus, the combination of members 12 and 24 and arms 20 and 21 form a mechanical pantograph device. An air cylinder 27 is attached to support 11 and arm 20 and on directed impulse moves the pantograph assembly through the arc path.

A jaw structure comprising a pair of hinged jaws 30 and 31 is pivotably attached to the member 24 and moves with it through a arc path in a horizontal attitude. The movement of the jaws is in a short arc path about a vertical axis.

As shown in FIGURES 7 and 8, a pair of vertical supports 33 and 34 having extensions 35 and 36 thereon are securely fastened to each of the hinged jaws 30 and 31. Each support is pivotably attached to member 24 by pins 37 and 38. Located in a cavity 41 in a depending portion of member 24 is a piston 42 forming with the cavity a double action air cylinder. Fittings 43 and 44 located at opposite sides of the cavity 41 admit air supplied through hoses 48 and 49 alternately into each end of the cavity when a switch (not shown) is actuated.

The end of piston 42 is pivotably attached to connector 50 which is pivotably attached to links 51 and 52 by means of pin 53. The links are likewise pivotably attached at their opposite ends to the extensions 35 and 36 of the vertical supports 33 and 34 by means of pins 54 and 55 respectively.

Thus, the hinged jaws 30 and 31 will be parted or opened when connector 50 and piston 42 move away from the hinged jaws. This movement is affected by permitting air to enter cavity 41 through fitting 43. When the movement of the piston 42 is reversed by the delivery of air into the position of the cavity 41 on the other side of piston 42 through fitting 44, hinged jaws 30 and 31 will move toward each other around their pivot pins 37 and 38.

Each hinged jaw 30 and 31 comprises an elongated portion 58 terminating in a semicircular portion 59. Semicircular plates 61 and 62 are slidably mounted in the pair of semicircular portions 59 and rotate within their own plane. Peripheral slots 65 and 66 are cut in portions 59 and carry bolts 67 and 68 which are connected to plates 61 and 62. The bolts 67 and 68 are attached to rod assemblies 70, one at the side of each elongated member. As shown in FIGURE 7, each rod assembly 70 passes through a housing 71 which is also mounted on the elongated member 58 and which contains a spring assembly tending to hold each of the plates 61 and 62 in a fixed angular position within its mounting. Each spring assembly comprises a coiled spring 72 mounted within the housing 71 and so attached to each rod assembly 70 as to exert a force against any displacement of the rod. The position of the rod assembly can be changed by means of a clamp 73 adjustably secured on the rod 70.

In contrast, the rod assembly 74 extends through said housing a greater distance so that, when the motion of the transfer arm moves the jaws 30 and 31 toward the mold, the rod extension 74 will abut an adjustable stop 77 mounted above the blow mold. Thus, force is exerted on the rod extension 70 by the stop 77 thereby imparting angular displacement to the plate 62 which in turn displaces the other plate 61 overcoming the positioning tendency of the pair of coiled springs 72. In this manner, a parison held between the plates 61 and 62 in a position as shown in FIGURE 5 would be rotated about its longitudinal axis to a position as shown in FIGURE 6. When the transfer arm assembly is moved away from the mold station, the spring assembly will return plates 61 and 62 to their original positions.

As shown in FIGURES 1 and 9, the adjustable stop 77 is attached to the mold station frame 10 by means of threaded bolt 82 engaging threaded opening 83 in the frame. By advancing bolt 82 with respect to opening 83, the position of stop 77 can be moved relative to the parison transfer arm. A rod 84 is mounted in an opening in the mold station frame 10 and extends beyond the adjustable stop 77. Attached to one end of rod 84 is a conical tip 85 which is threadedly adjustable with respect to rod 84 to permit movement thereof toward and away from the transfer arm. When the transfer arm is in its retracted or lowermost position, a conical female receptacle 86, mounted on member 24, contacts tip 85 to stop the downward arcuate movement of the transfer arm.

The mold jaws 91 and 92 have lever extensions 93 and 94 pivotably attached to support 11. Additional extensions 95 and 96 on each side extend rearwardly of the mold and form clevis joints with ends of members 97 and 98. The opposite ends of members 97 and 98 are pivotally attached to a joining member 99 which is operably connected to an air cylinder 100. Mold halves 101 and 102 are removably attached between the mold jaws 91 and 92 to permit replacement of the mold halves with molds of other configuration for the production of articles having a different size, shape or weight.

As shown in FIGURES 1, 10, 11, and 12, a member 105 having bifurcated end 106 is secured to member 107 which is pivotally attached at its upper end to members 108 and 109 in a clevis joint. Members 108 and 109 are secured to support 104. Member 110 has a slot 111 shown in FIGURE 11 and is pivotally attached at its lower end to members 112 and 113 which straddle support 104 in the same plane as members 108 and 109 and are pivotally attached to member 107. Joining member 99 is attached to a piston rod of air cylinder 100 which operates the mold jaws. Extensions 114 and 115, joined by a bar 116 at their ends, project outwardly from joining member 99 to permit engagement of bar 116 in slot 111 when the piston rod of cylinder 100 is in its extended position as shown in FIGURE 12.

Thus, when a parison is transferred from an extruder to a mold station in a freely swinging condition, the lower end portion of the parison is received by bifurcated end 106 of the positioner (FIGURE 10) and steadied until the mold closes. As the mold closes, the parison positioner is withdrawn from between the mold halves and bar 116 is disengaged from slot 111.

A blow stick 120, positioned directly below the mold halves, has its vertical axis aligned with the longitudinal axis of a transferred parison. At the lower end of blow stick 120 is a cylinder 121 having fittings 122 and 123 which are connected to sources of low pressure and high pressure air (not shown). The blow stick 120 comprises a hollow mandrel having an upper tapered portion 124 and a lower cylindrical portion 125. Support 126 is attached to mold frame 10 and at its forked end has a sleeve bearing 127 in which the blow stick is reciprocally mounted. Pivotally attached to frame 126 is a double action air cylinder 129 arranged for arcuate movement at its opposite end. Piston rod 130 of cylinder 129 is secured to member 131 which in turn is pivotally attached to member 132. Member 132 is pivotally mounted upon frame 126 so as to move member 133, pivotally attached at its upper end, downward. Member 133 is pivotally attached to one end of a clamp 134 secured to the blow stick 120. A gear wheel 137 engages teeth 138 in the side of blow stick 120 forming a rack and pinion arrangement to initially adjust the height of the blow stick 120 with reference to the blow mold before the blow stick is clamped into position.

In the operation of the apparatus shown in the drawings, the transfer arm moves in an arc path from its extended position below the extruder nozzle downward to a retracted position centered directly above the blow mold. The movement of the transfer arm in a downward motion minimizes sagging or stretching of the parison during transfer. The parison orienter portion of the transfer arm assembly grabs the parison from the extruder and rotates the parison about its longitudinal axis as the parison is being transferred to the mold station. The rotation of the parison is performed when it is desired to position an oblong or elliptical parison in a blow mold in a particular angular orientation. However, where a round parison with a uniformly thick periphery is being molded, a parison orienter of the type described above is not required and a simple pincers may be employed. Stop 77, mounted upon mold station frame 10, can be adjusted toward or away from operating rods 44 of the parison orienter to increase or decrease the rotation of semicircular plates 61 and 62 for a particular mold station position.

The conical tip 85 on stationary rod 84, which projects beyond adjustable stop 77, acts as a stop for the transfer arm assembly as it reaches its lower or retracted position. By means of the threaded connection between the tip 85 and the rod 84, the mean rearward position of the transfer arm can be adjusted to accurately position a parison within the mold.

When the upper portion of a parison is stopped abruptly by the contact of the transfer arm against tip 85, the lower portion of the parison swings between the mold halves 101 and 102 and into contact with bifurcated end 106 on the end of the parison positioner. At this point the parison positioner is at its extended position. The bifurcated end 106 steadies the lower portion of the parison until the tapered portion 124 of the blow stick 120 embeds itself into the open lower end of the parison. The air cylinder 100 then withdraws joining member 99 which brings mold halves 101 and 102 together. As the mold halves move toward each other, the parison positioner withdraws from between the mold halves.

It will be appreciated that proper positioning of a parison within a blow mold is an important feature of the present invention in order to produce accurately molded hollow plastic articles. If the parison is not properly positioned, application of fluid pressure to the interior of the parison will expand it unevenly and often result in holes or nonuniform wall thickness in the final article, thus increasing the number of rejects.

The above description shows that the method and apparatus of the present invention provide a simple and convenient means for producing hollow plastic articles such as containers or bottles at a substantially higher rate than has heretofore been possible. Further, the present invention permits the high extrusion rates of continuous extruders to be efficiently utilized. Moreover, the method and apparatus of the invention permit great flexibility in the production of hollow plastic articles varying widely in size, shape, and weight. Also, the number of rejects are minimized by the method and apparatus of the invention due to the accuracy of alignment of the parison within the mold cavity.

From the above description of the invention, it will be apparent that various modifications in the apparatus and procedure described in detail herein may be made within the scope of the invention. For example, the transfer mechanism pincer jaws and parison positioner may be of a different design and operation while still achieving the advantages and benefits of the invention. Therefore, the invention is not intended to be limited to the specific details of procedure and apparatus described herein except as may be required by the following claims.

What we claim is:

1. A method for forming hollow plastic articles by expansion of a parison within a closed sectional blow mold comprising the steps of grasping the upper portion of a heated parison at a position above and laterally displaced from a sectional mold, transferring the parison downwardly and outwardly to the open sectional mold with the initial portion of the transfer movement producing the greater portion of the downward movement of the parison and the final portion of the transfer movement producing the greater portion of the lateral movement of the parison, rapidly stopping and aligning the parison within the open sectional mold, closing the sectional mold around the aligned parison, blowing the finished article, opening the sectional mold and removing the article.

2. A method as set forth in claim 1 wherein the transfer movement is along an arcuate path.

3. A method for forming hollow plastic articles by expansion of a parison within a sectional blow mold comprising extruding a parison at a point above and laterally displaced from a sectional mold, grasping the parison at its upper portion and transferring it downwardly and outwardly through an arcuate path to the open sectional mold, stopping the grasped portion of the parison in proper alignment with the open sectional mold, aligning the lower portion of the parison within the open sectional mold by contacting it with the member protruding into the open sectional mold, closing said sectional mold around the aligned parison while moving the aligning member outside of the sectional mold, and blowing the finished article.

References Cited
UNITED STATES PATENTS

| | | | |
|---|---|---|---|
| 2,750,624 | 6/1956 | Coates et al. | 264—99 |
| 1,557,850 | 10/1925 | La France | 65—323 |
| 1,607,607 | 11/1926 | Cramer | 65—323 |
| 2,750,625 | 6/1956 | Coates et al. | 264—99 |
| 2,783,503 | 3/1957 | Sherman | 264—99 |
| 2,935,764 | 5/1960 | Mason | 264—98 |
| 2,978,745 | 4/1961 | Langecker | 264—99 |
| 3,000,051 | 9/1961 | Schaich | 264—99 |
| 3,080,614 | 3/1963 | Adams | 264—98 |
| 3,204,018 | 8/1965 | Hagen | 264—99 |

ROBERT F. WHITE, *Primary Examiner.*

A. R. NOE, *Assistant Examiner.*